US010372934B2

(12) United States Patent
Mathur et al.

(10) Patent No.: US 10,372,934 B2
(45) Date of Patent: Aug. 6, 2019

(54) ACCESS CONTROLLED QUERIES AGAINST USER DATA IN A DATASTORE

(71) Applicant: salesforce.com, inc., San Francisco, CA (US)

(72) Inventors: Rohitashva Mathur, Walnut Creek, CA (US); Prem Veeramani, Dublin, CA (US); Jesse Collins, Oakland, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 224 days.

(21) Appl. No.: 15/295,288

(22) Filed: Oct. 17, 2016

(65) Prior Publication Data

US 2018/0025174 A1 Jan. 25, 2018

Related U.S. Application Data

(60) Provisional application No. 62/364,964, filed on Jul. 21, 2016.

(51) Int. Cl.
*G06F 17/30* (2006.01)
*G06F 21/62* (2013.01)
*H04L 29/08* (2006.01)

(52) U.S. Cl.
CPC .......... *G06F 21/6227* (2013.01); *H04L 67/02* (2013.01); *H04L 67/1097* (2013.01)

(58) Field of Classification Search
CPC .................. G06F 17/30023; G06F 21/6227
USPC .................................................. 707/781
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Joshua Bullock
(74) *Attorney, Agent, or Firm* — Schwabe Williamson & Wyatt

(57) ABSTRACT

In an example, a processing device of a datastore system may be configured to identify one or more grants of permission corresponding to one or more first objects, respectively, wherein the one or more first objects comprise only a subset of objects of a datastore, wherein the one or more grants of permission are by a user of the datastore; generate an access control entry for a second object of the objects using at least one of the identified grants of permission, wherein the second object is not exposed to the user; and in responsive to receipt of a query for data corresponding to the objects, determine whether to grant access to the data based on the generated access control entry.

25 Claims, 7 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,236,996 B1 | 5/2001 | Bapat et al. |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,650,335 B2 | 1/2010 | Leetaru et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,740,873 B1 * | 8/2017 | Ho .................... G06F 21/6209 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0230282 A1 | 10/2006 | Hausler |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2011/0218958 A1 | 9/2011 | Warshaysky |
| 2011/0247051 A1 | 10/2011 | Bulumulla |
| 2011/0277017 A1* | 11/2011 | Ivanov ................. G06F 21/6218 726/4 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0282818 A1* | 9/2014 | Singer ................. G06F 21/6218 726/1 |
| 2014/0359537 A1 | 12/2014 | Jackobson et al. |
| 2017/0048253 A1* | 2/2017 | Anton ..................... H04L 63/10 |
| 2017/0070504 A1* | 3/2017 | Ramachandran ....... H04L 63/20 |

\* cited by examiner

ACCESS CONTROLLED QUERIES AGAINST USER DATA IN A DATASTORE

CROSS-REFERENCE TO RELATED APPLICATION

This application claims benefit of U.S. Application No. 62/364,964, filed Jul. 21, 2016, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to datastores, and some embodiments are related to access controlled queries against user data in a datastore, e.g., a relational datastore.

DESCRIPTION OF THE RELATED ART

Cloud computing involves access to a shared pool of configurable computing resources. In some cloud computing systems, cloud computing subscribers may build and host applications on a platform provided by cloud computing provider.

The cloud computing subscribers may upload data stored on a datastore of the cloud computing service (in some systems at least a portion of this data may be referred to as "customer data" in some systems and/or may be owned by the subscribers). The infrastructure maintenance users (e.g., of the cloud computing provider) generally have restricted access to at least some of the data from the subscribers. In some systems, efforts to restrict access by the infrastructure maintenance users can imped maintenance activities, including the troubleshooting of performance issues, data corruption issues, debug system malfunction issues, or the like.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
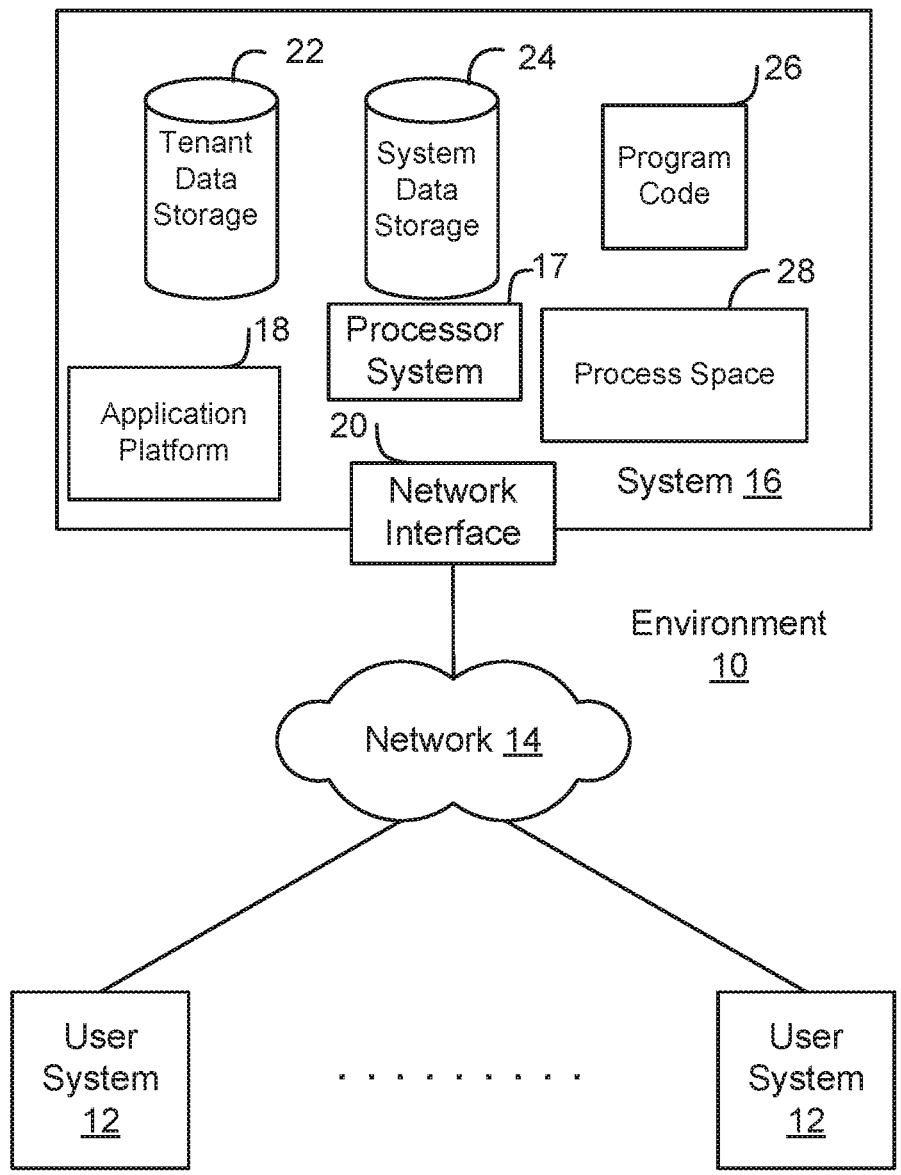
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for access controlled queries against customer data in a datastore, e.g., a relational database.

In an example, a processing device of a datastore system may be configured to identify one or more grants of permission corresponding to one or more first objects, respectively, wherein the one or more first objects comprise only a subset of objects of a datastore, wherein the one or more grants of permission are by a user of the datastore; generate an access control entry for a second object of the objects using at least one of the identified grants of permission, wherein the second object is not exposed to the subscriber; and in responsive to receipt of a query for data corresponding to the objects, determine whether to grant access to the data based on the generated access control entry.

In some embodiments, the datastore may be for a cloud server, the user may be a subscriber of a cloud service, the user data may be customer data, and the one or more first objects includes a business object. However, features described herein can be applied to databases generally, and as such are not limited to cloud services. As an example, a datastore may be for an organization having more than one user roles, e.g., first users that have access to manipulate the data and second users that are in a diagnostic role (performance management, or the like). In one example, the datastore may be an in-house datastore (for example an "intranet" database), and the first users may be human resources employees that have access to sensitive data such as payroll data, and the second users may be administrators of the datastore. The first objects may be of the sensitive data, e.g., the payroll data.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
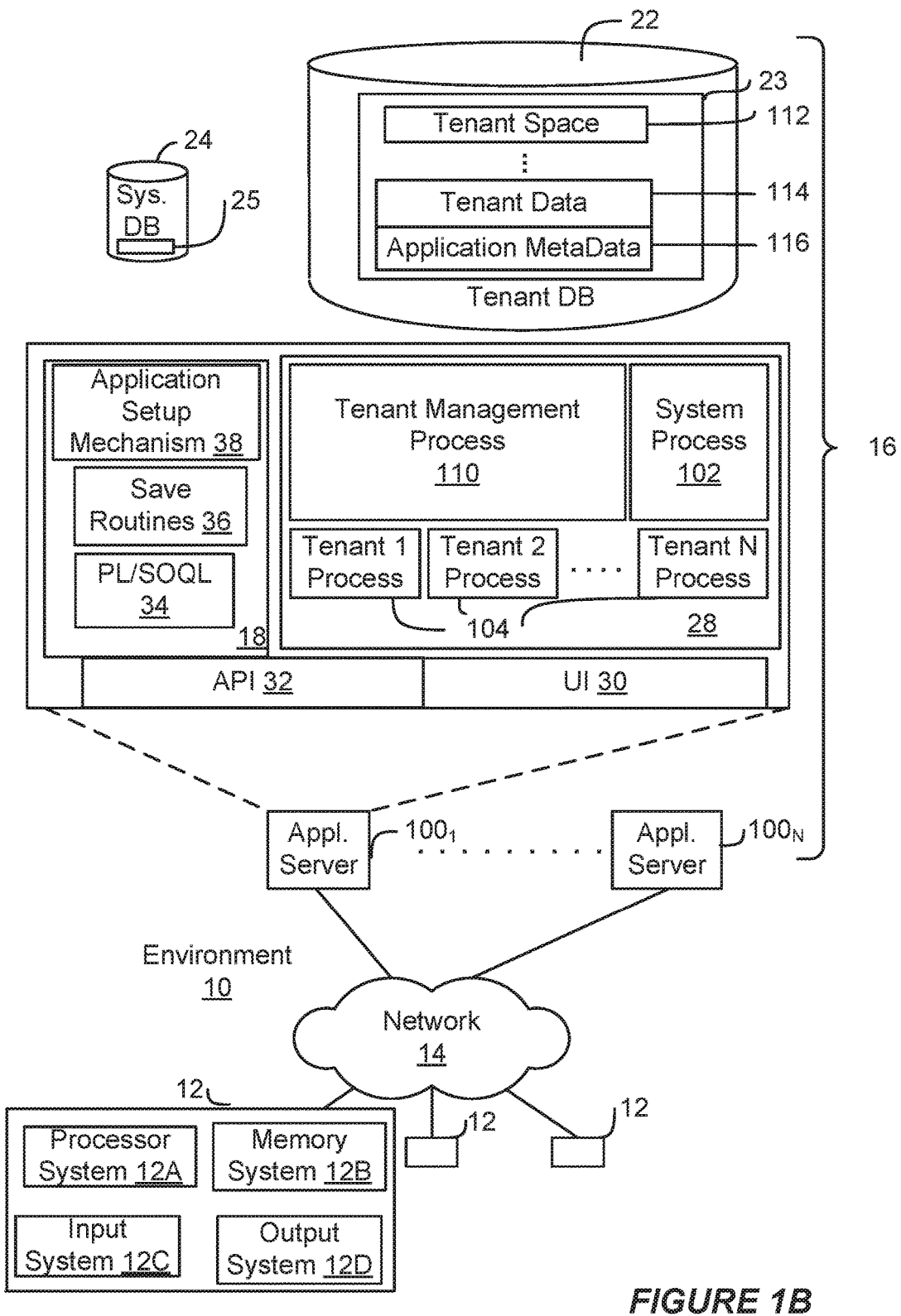
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Introduction for Access Controlled Queries Against Customer Data in a Datastore A method enables business users to tag first objects' attributes, e.g., business objects' attributes, to allow reading and editing of the first objects and their attributes by non-business users. In an example, the first objects are business objects, e.g., (e.g., modular combine-able code blocks). Non-business users are allowed access to first objects based on system permissions. The method maps the first objects to associated second objects, e.g., their lower level data representations, allowing non-business users to access and edit the second objects by operating upon the first objects, which may be more easily operated upon.

As used herein. "business users" refers to users of a datastore. In embodiments where the datastore is for a cloud server, these users may be subscribers of a cloud computing service, such as entities that build and host applications constructed from first objects. These users may grant permissions for access (e.g., read access and/or write access) corresponding to first objects and/or their attributes. In some cases, these users may own the data to which they grant permission for access, although this is not required. "Non-business users" are other entities, such as infrastructure maintenance users that are involved in improving application performance, optimizing application resources, and providing customer support for a variety of business users.

Non-business users may execute queries (e.g., data manipulation language (DML) and data definition language (DLL) actions) against a datastore directly, with consent of the business users that own the data in the datastores. The business users interact with the data in the datastores at the level of first objects (e.g., business objects), and can grant the non-business users access to some or all first objects and their attributes. However, the non-business users often need to execute queries against second objects, e.g., objects that are not exposed to the business users for a variety of reasons (for instance, low level database objects such as tables, columns, procedures, views, functions, sequences, or the like, or combinations thereof).

Embodiments of a process and systems are described that enable business users to grant query access to nonbusiness users to some or all first objects, along with some or all of their attributes. The granted accesses are translated to query access permissions against the second objects, e.g., low level database objects, such as tables, columns, procedures, views, functions, sequences, or the like, or combinations thereof. A query execution interface enables non-business users to issue native database queries (e.g., SQL) against the database, after validating that the issued queries select, filter and join tables only against those columns for which right access can be deduced based on the accesses granted on the first objects (and their set of corresponding attributes, e.g., business object attributes). Particular second objects, e.g., low level database objects, may or may not be queryable based on flexible system rules.

In an example, a system manages permissions of computing objects dynamically. Instructions to recalculate permissions are created and associated with an object. The instructions are invoked when the object changes, so that modifications of that object's attributes result in changes to the object's access permissions.

III. Access Controlled Queries Against Customer Data in a Relation Datastore

Figure 2:
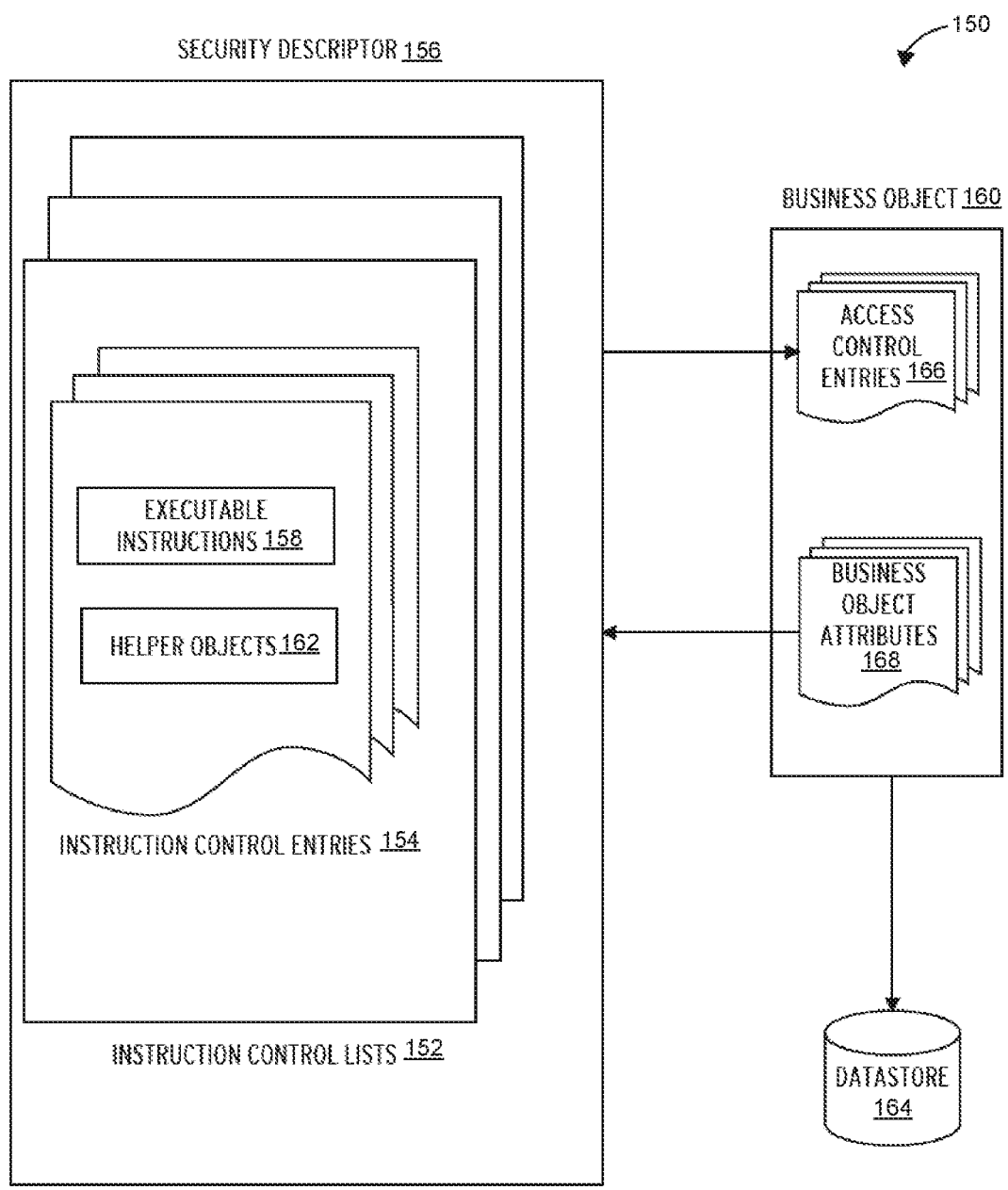
FIG. 2 illustrates an access control structure in accordance with one embodiment.

FIG. 2 illustrates an access control structure 150 in accordance with one embodiment. In some embodiments, the datastore 164 may correspond with any database described herein (e.g., the tenant database 22), and may include any components thereof. In some embodiments, at least one of the security descriptor 156 or the business object 160 may be accessible to any device described in FIGS. 1A-1B (e.g., any application server), and the operations performed on and/or using the security descriptor 156 and/or the business object 160 may be performed thereby (wholly or in part). In some examples, some of the operations performed on and/or using the security descriptor 156 and/or the business object 160 may be performed by any user system of FIGS. 1A-B (an application server may download code, which may be executed in some examples by a standard browser that is specially configured when executing the code to perform these operations).

An improved security descriptor 156 may store executable information or may refer to executable information. The security descriptor may be utilized for dynamically creating access control entries 166, modified or deleted responsive to a change of attributes of a business object 160. Those dynamically created, modified or deleted access control entries 166 may be referred to as managed access control entries.

The owner of a business object 160 may specify how permissions of the business object 160 depend on business object attributes 168 of the business object 160 via a new object data type and object, referred to as instruction control entries 154. Instruction control entries 154 are stored in a new collection data type and collection, which will be referred to as instruction control lists 152. The improved security descriptor 156 may store a plurality of instruction control lists 152.

Each of the instruction control entries 154 may include executable instructions 158 represented by an algorithm, rule, policy or similar structure. Every time the business object 160 may be stored to the datastore 164, the executable instructions 158 may read business object attributes 168 of that business object 160 as input parameters and may apply them to generate a list of managed access control entries 166. In addition to the executable instructions 158, each of the instruction control entries 154 can optionally include helper objects 162 such as preset lists of entities or preset lists of access rights, which help it to build managed access control entries 166. Access permissions of a business object 160 may thus change dynamically every time that business object 160 changes.

Figure 3:
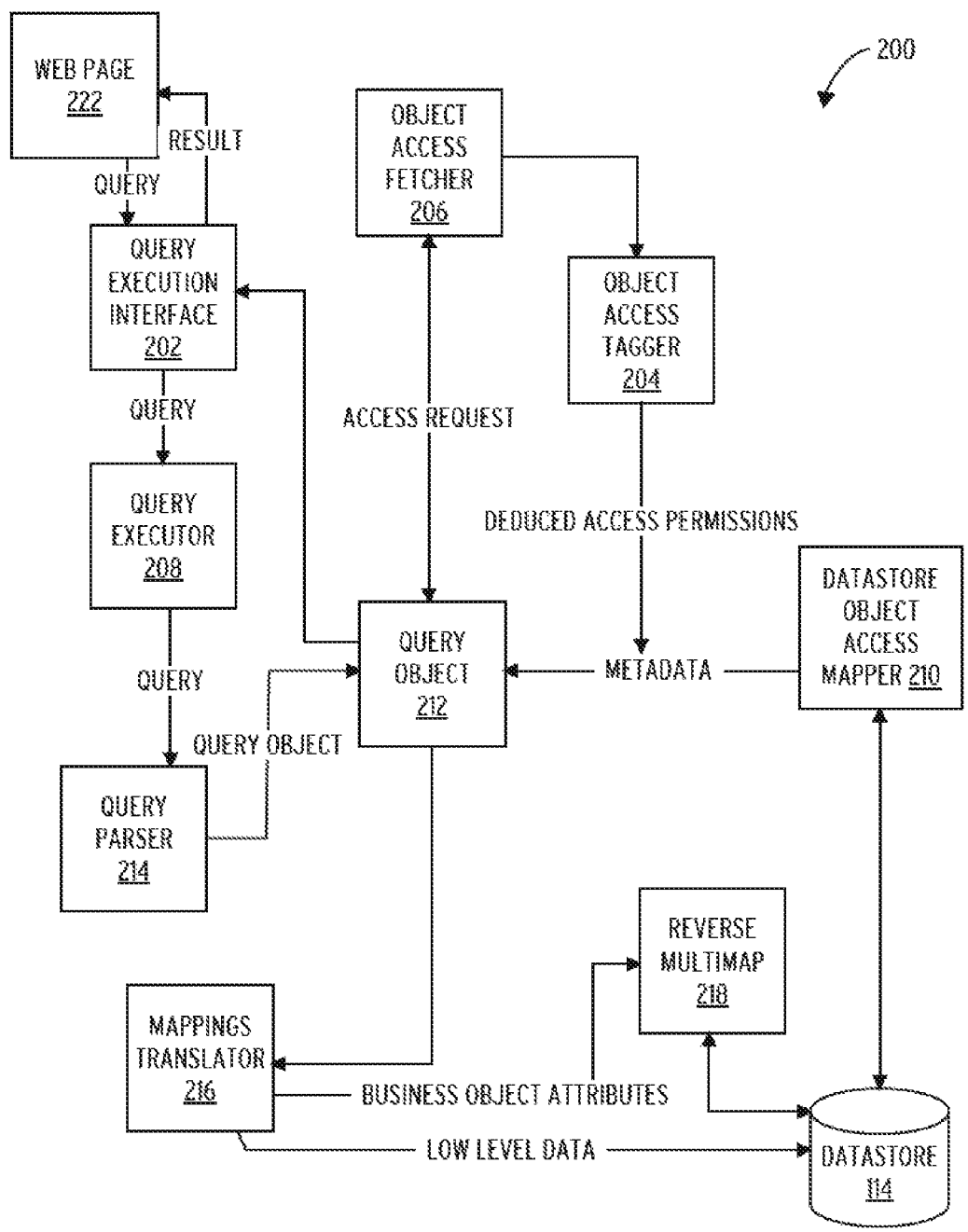
FIG. 3 illustrates an access controller in accordance with one embodiment.

FIG. 3 illustrates an access controller in accordance with one embodiment. In some examples, the components described with respect to FIG. 3 may be part of one or more of the devices of the system of FIGS. 1A-B. For instance, an application server may download code to a user system, and this code may be executed in some examples by a standard browser that is specially configured when executing the code to provide some or all of these components (e.g., the query execution interface 202 and/or the object access tagger 204, etc.). Other components besides those provided by the user system may be provided by the application server of FIGS. 1A-1B, in some examples.

Referring to FIG. 3, the query execution interface 202 may be a machine interface through which a non-business user issues a query. The query execution interface 202 may return results if the query is accessing data that has been granted permissions by the business users/data owners for access by the nonbusiness users. Otherwise the query execution interface 202 may block the query, and may return an error to the issuing non-business user. The query execution interface 202 may be accessed programmatically or manually via a user interface (UI) such as a web page 222 (for instance a web page to be displayed on the user system 12 of FIGS. 1A-B, an API (application program interface) call, a REST (representational state transfer) call, or the like, or combinations thereof).

The object access tagger 204 may be implemented for example as a set of UI screens and/or an application program interface (API) that may enable the business users/data owners to tag each of their owned business objects and their set of corresponding business object attributes with access permissions. In some examples, the object access tagger 204 may be associated with an interface to select, to tag as readable or writable or both, only objects to which the subscriber is exposed to. The object access tagger 204 may have an operational granularity sufficient to operate on a single attribute of the business objects at a time, or it may operate on all business objects in bulk. The access permissions may be granted in variety of ways (by means of inheritance, relationships, globally based on type of the attributes, matching a pattern, and so on).

The object access fetcher 206 may return the granted accesses for a business object and its set of corresponding business object attributes.

The mappings translator 216 may operate to translate a set of provided business objects to their low level representation in the datastore 164 (such as tables, columns, procedures, views, functions, sequences, or the like, or combinations thereof).

The reverse multimap 218 may be constructed to map between the corresponding low level representations and the business object attributes. A map may be a key map to a value; a multimap may be a key map to more than one value. A multimap may be for the attributes of the first object mapped to the second objects. The reverse multimap 218 may be for the second objects mapped to the attributes of the first objects.

The datastore object access mapper 210 may generate metadata representing the low level objects in the datastore 164, and may annotate that metadata with deduced access permissions from access permissions, granted by the business users/organization owning the data in the business objects, using the object access tagger 204.

The query executor 208 may control the flow of execution of the query.

The query parser 214 may parse the issued query, may validate syntax, and may convert the query to a higher level object form, the query object 212, which may be more suitably operated upon.

The query object 212 may be a high level representation of the issued query, created by the query parser 214. The query object 212 may preserve all relationships between low level database objects referred to in the query. The query object 212 may make available the following categories of columns, all fully qualified (schema, db-table name, and column-name):

a. All selected columns.

b. All columns that are part of any join conditions between the tables.

c. All columns against which data selection criteria have been specified (predicates/filters).

The final selected column list, filtered on column list, and join list need not necessarily have been directly specified in the query (select-star expansion, alias resolution, scope inference, part of an expression), but the query parser 214 may traverse all scopes and aliases and may recursively resolve the associated columns until they cannot be resolved any further.

In one embodiment, a business user may operate the object access tagger 204 to tag one or more business objects and their set of corresponding business object attributes as readable (and/or writable). A nonbusiness user may operate the query execution interface 202 to submit a query for execution by the query executor 208. The query executor 208 may invoke the query parser 214, and may submit the query to the query parser 214 for execution.

The query parser 214 may parse the submitted query, and after validating syntax (e.g. using a formal grammar), may create and may return a corresponding query object 212 to the nonbusiness user ("invokee"). If a syntax error is found, the query parser 214 may return an error, with details, to the invokee. The query executor 208 may validate that the submitted query may have a filter specified for a target organization. If the query executor 208 does not find a filter specified for the target organization, it may generate one.

The query executor 208 may invoke the mappings translator 216 to translate all the business objects and their set of corresponding business object attributes to their corresponding tables and columns, for the target organization. The query executor 208 may apply mapping information from the mappings translator 216 to build a reverse multimap 218 between columns and business object attributes of the business objects. The relationship may be many-to-many (one column may map to multiple business object attributes (either for the same business object or across different business objects), and multiple business object attributes (belonging to the same business object or different business objects) may map to the same column). The query executor 208 may cache, e.g., persist, the reverse multimap 218 for reuse, or rebuild the reverse multimap 218 as needed.

Figure 4:
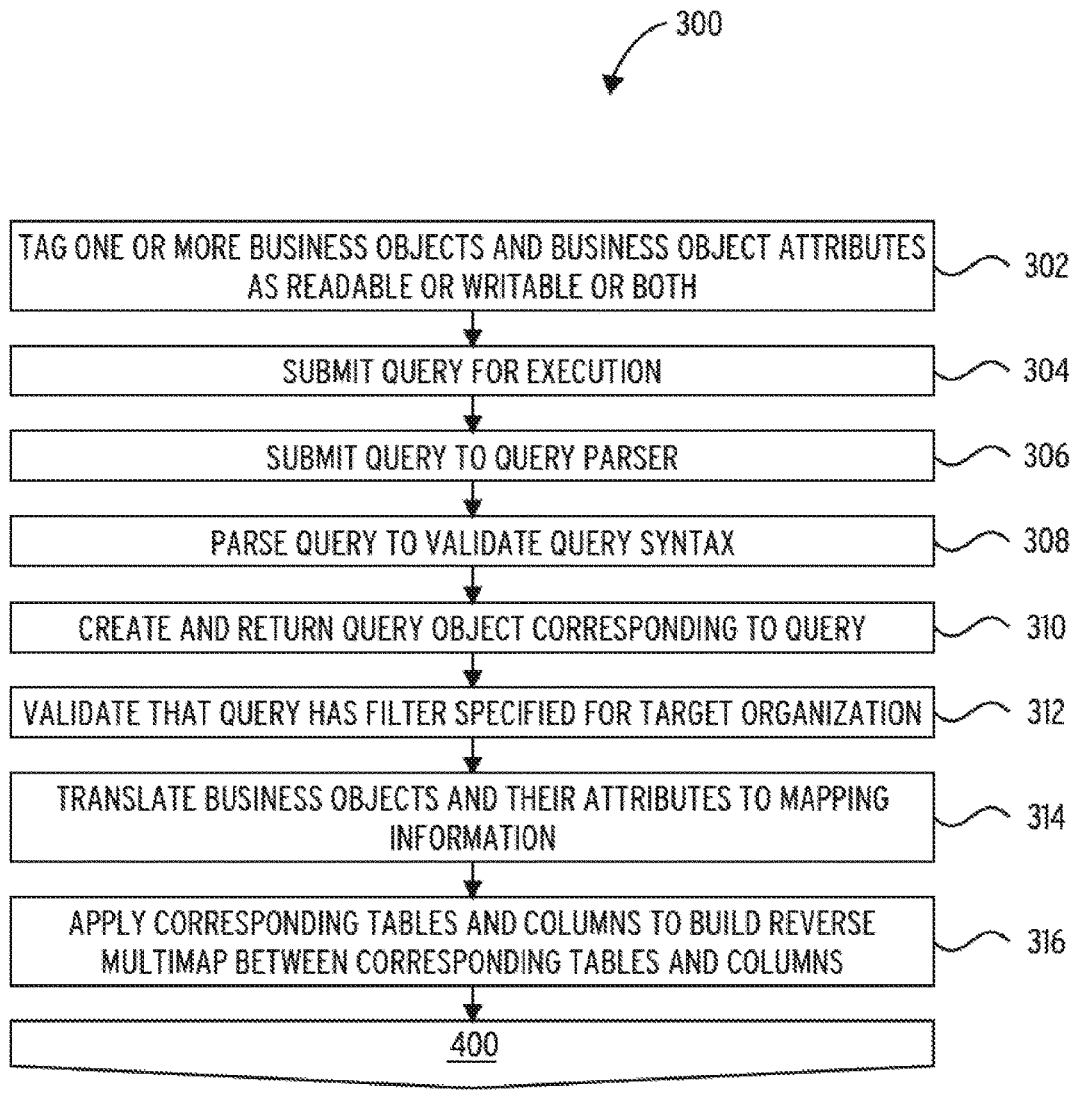
FIG. 4 illustrates a process for issuing access controlled queries in accordance with one embodiment.

Referring to FIG. 4, in block 302, process for issuing access controlled queries 300 may tag one or more business objects and business object attributes as readable or writable or both. In some examples, the tagging may correspond to any available renderings of the business objects, and the tagging may be using standardized UI/API components and/or special purpose UI/API components.

In block 304, process for issuing access controlled queries 300 may submit a query for execution. In block 306, process for issuing access controlled queries 300 may submit the query to a query parser. In block 308, process for issuing access controlled queries 300 may parse the query to validate a query syntax. In block 310, process for issuing access controlled queries 300 may create and may return a query object corresponding to the query. In block 312, process for issuing access controlled queries 300 may validate that the query has a filter specified for a target organization. In block 314, process for issuing access controlled queries 300 may translate the business objects and their attributes to mapping information. In block 316, process for issuing access controlled queries 300 may apply the low level representations (e.g., tables, columns, procedures, views, functions, sequences, or the like, or combinations thereof) to build a reverse multimap between the corresponding low level representations. Processing then may continue at process for issuing access controlled queries 400.

In one embodiment, the query executor 208 may query the query object 212 for all the columns that appear in the query, directly or indirectly (e.g., may directly select of a column, select as a function on one or more columns, joins, filters). For each of these columns, the query executor 208 may query the reverse multimap 218 [column-name]→{business-object.Attribute}, to retrieve the set of business object attributes that the particular column maps to. The query executor 208 may create a set of corresponding business object attributes corresponding to the retrieved business object attributes, that may hold accesses granted to each of the business object attributes by the data owner/business user. The query executor 208 may apply system rules and/or configuration to reduce the accesses set to a value of readable or a value of not readable (e.g. system rules that may reduce the accesses set to one value, for example reducing the set to the most permissive access or reducing the set to most restrictive value). For columns that are not part of business objects, flexible system rules may or may not grant read and/or write access to the columns that directly or indirectly appear in the query.

If the reduced set is found to have a value of not readable, the query executor 208 may stop any further processing, and may indicate to the invokee of the query executor 208 that the query violates access permissions for the business objects.

However, if all the columns that directly or indirectly appear in the query are found to have a reduced access value of readable, the query executor 208 may submit the query to the datastore 164 for execution, and transparently may return a datastore response to the invokee via the query execution interface 202.

Figure 5:
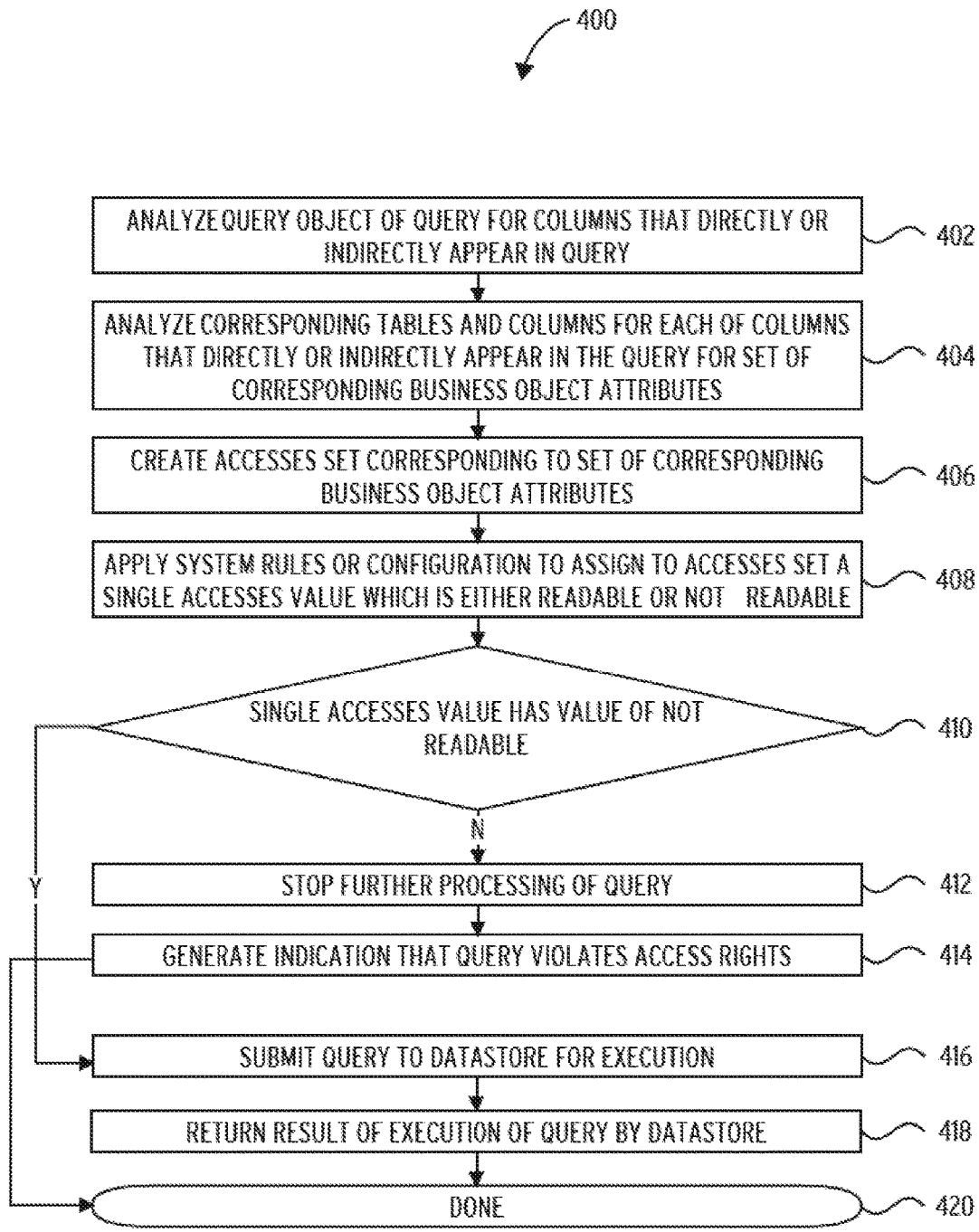
FIG. 5 illustrates a process for issuing access controlled queries in accordance with one embodiment.

Referring to FIG. 5, at block 402 process for issuing access controlled queries 400 may analyze a query object of a query for columns that directly or indirectly appear in the query. In block 404, process for issuing access controlled queries 400 may analyze corresponding tables and columns for each of the columns that directly or indirectly appear in the query for a set of corresponding business object attributes. In block 406, process for issuing access controlled queries 400 may create an accesses set corresponding to the set of corresponding business object attributes. In block 408, process for issuing access controlled queries 400 may apply system rules or configuration to assign to the accesses set a single accesses value which may be either readable or not readable, in some examples. In decision block 410, process for issuing access controlled queries 400 may test if the single accesses value has a value of not readable. If so, in block 412, process for issuing access controlled queries 400 may stop further processing of the query and in block 414 and may generate an indication that the query violates access rights. Otherwise, in block 416, process for issuing access controlled queries 400 may submit the query to a datastore for execution and in block 418 may return a result of execution of the query by the datastore. In done block 420 process for issuing access controlled queries 400 ends.

Figure 6:
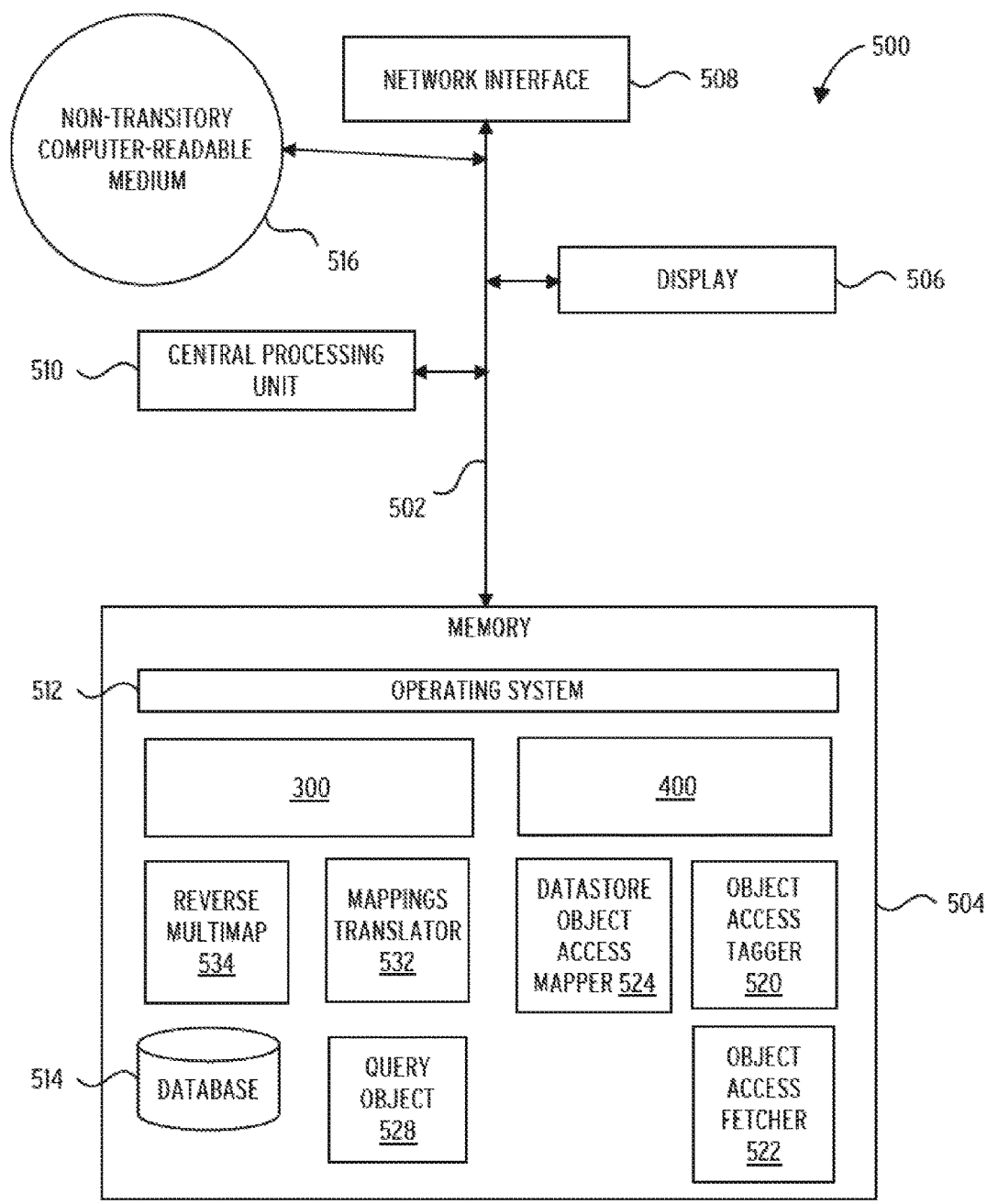
FIG. 6 illustrates a system 500 in accordance with one embodiment.

FIG. 6 illustrates several components of an exemplary system 500 in accordance with one embodiment. In various embodiments, system 500 may include a desktop PC, server, workstation, mobile phone, laptop, tablet, set-top box, appliance, or other computing device that is capable of performing operations such as those described herein. In some embodiments, system 500 may include many more components than those shown in FIG. 5. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 500 may comprise one or more physical and/or logical devices that collectively provide the functionalities described herein. In some embodiments, system 500 may comprise one or more replicated and/or distributed physical or logical devices.

In some embodiments, system 500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 500 includes a bus 502 interconnecting several components including a network interface 508, a display 506, a central processing unit 510, and a memory 504.

Memory 504 generally comprises a random access memory ("RAM") and permanent non-transitory mass storage device, such as a hard disk drive or solid-state drive. Memory 504 stores an operating system 512.

These and other software components may be loaded into memory 504 of system 500 using a drive mechanism (not shown) associated with a non-transitory computer-readable medium 516, such as a floppy disc, tape, DVD/CD-ROM drive, memory card, or the like.

Memory 504 also includes database 514. In some embodiments, system 500 may communicate with database 514 via network interface 508, a storage area network ("SAN"), a high-speed serial bus, and/or via the other suitable communication technology.

In some embodiments, database 514 may comprise one or more storage resources provisioned from a "cloud storage" provider, for example, Amazon Simple Storage Service ("Amazon S3"), provided by Amazon.com. Inc. of Seattle, Wash., Google Cloud Storage, provided by Google, Inc. of Mountain View, Calif. and the like.

To illustrate operation of the system above in a simple case, consider an example of a page including information about people related to a cloud server. The information may include name, SSN (social security number), and address. The business user (e.g., subscriber of the cloud service) may access a rendering of this information.

This information may be stored in a table of a relational database of the cloud service. The address may be stored as more than one column, e.g., address line one and address line two. Although the address which is shown as one entity in the rendering, the address may be stored in more than one column in the table of the database (e.g., address line one, address line two, etc.).

The business user may grant read access to only the name and the address of the rendering. The business user may not be exposed to relational database storage artifacts, such as the columns. For example, an object access tagger may include an interface to select the rendering of the name, SSN and address for granting access, or not (the relational database storage artifacts may not be selectable by this interface).

After the grant of access to the rendering using the tagger, a non-business user may use a query execution interface to issue an inquiry to select information including SSN (e.g., an inquiry have a filter corresponding to SSN). The query may fail, e.g., is not submitted to the database, because the access was not granted on the SSN rendering. However, in contrast, with respect to the address an inquiry by a non-business user selecting one of the columns of the address may succeed (even though the grant of read access may be to the rendering for the address).

EXAMPLES

Example A is a method, comprising: tagging one or more business objects and business object attributes as readable or writable or both; submitting a query for execution; submitting the query to a query parser; parsing the query to validate a query syntax; creating and returning a query object corresponding to the query; validating that the query has a filter specified for a target organization; translating the business objects and their attributes to mapping information comprising corresponding tables and columns for the target organization; and applying the corresponding tables and columns to build a reverse multimap between the corresponding tables and columns and the business object attributes.

Example B is a method, comprising: analyzing a query object of a query for columns that directly or indirectly appear in the query; analyzing corresponding tables and columns for each of the columns that directly or indirectly appear in the query for a set of corresponding business object attributes; creating an accesses set corresponding to the set of corresponding business object attributes comprising accesses granted to each of the business object attributes by a data owner; applying system rules or configuration to assign to the accesses set a single accesses value which is either readable or not readable; if the single accesses value has a value of not readable; stopping further processing of the query; generating an indication that the query violates access rights; otherwise if the single accesses value has a value of readable; submitting the query to a datastore for execution; and returning a result of execution of the query by the datastore.

Example 1 is a memory device having instructions stored thereon that, in response to execution by a processing device, cause the processing device to perform operations comprising: identifying one or more grants of permission corresponding to one or more first objects, respectively, wherein the one or more first objects comprise only a subset of objects of a datastore for a cloud service, wherein the one or more first objects includes a business object and the one or more grants of permission are by a subscriber of the cloud service; generating an access control entry for a second object of the objects using at least one of the identified grants of permission, wherein the second object is not exposed to the subscriber; and in responsive to receipt of a query for data corresponding to the objects, determining whether to grant access to the data based on the generated access control entry.

Example 2 may include the subject matter of example 1, and the operations further comprise generating a user interface to enable one or more users of the subscriber to select, for tagging as readable or writable or both, only objects of the subset of the objects.

Example 3 may include the subject matter of any of examples 1-2, or any other example herein, and the second object comprises a relational datastore storage artifact.

Example 4 may include the subject matter of any of examples 1-3, or any other example herein, and the relational datastore storage artifact includes at least one of a relational database table, a relational database column, a relational database procedure, a relational database view, a relational database function, or a relational database sequence.

Example 5 may include the subject matter of any of examples 1-4, or any other example herein, and the cloud service comprises a PaaS (platform as a service) and the business objects comprise modular combinable code blocks.

Example 6 may include the subject matter of any of examples 1-5, or any other example herein and the identified one or more grants of permission correspond to at least one of read access or write access.

Example 7 may include the subject matter of any of examples 1-6, or any other example herein, and the operations include: translating information about the first objects to mapping information comprising the second objects; and using the mapping information to generate the access control entry.

Example 8 may include the subject matter of any of examples 1-7, or any other example herein, and the second objects correspond to at least one of a relational database table, a relational database column, a relational database procedure, a relational database view, a relational database function, or a relational database sequence.

Example 9 may include the subject matter of any of examples 1-8, or any other example herein, and the grants of permission are for renderings of data associated with the first objects.

Example 10 may include the subject matter of any of examples 1-9, or any other example herein, and constructing a reverse multimap to map between the second objects and attributes of the first objects; wherein determining whether to grant access to the data based on the generated access control entry includes querying the reverse multimap.

Example 11 is a memory device having stored thereon: an instruction control entry including executable instructions to read tagging data of a first object responsive to storage of the first object of a plurality of objects in a datastore of a cloud service or modification of the first object in the datastore, to generate an access control entry for a second object of the plurality of objects based on a result of the reading; and an instruction control interface module to determine whether to grant access to data that is of the datastore and associated with the second object based on the generated access control entry, to return a result for the query based on a result of the determination.

Example 12 may include the subject matter of example 11, or any other example herein, and the returned result includes a grant of access to the data or user messaging indicating no access to the data.

Example 13 may include the subject matter of any of examples 11-12, or any other example herein, and the returned result is to be presented on a web page.

Example 14 may include the subject matter of any of examples 11-13, or any other example herein, and the determination is for access by a first category of user and the memory device further having stored thereon: an object access tagging module to generate the tagging data based on a user selection of a second category of user that is different than the first category of user.

Example 15 may include the subject matter of any of examples 11-14, or any other example herein, and further having stored thereon: a mapping translator module to construct a multimap to map an attribute of the first object to at least the second object and a third object of the plurality of objects, the multimap usable to generate a reverse multimap to be used to determine whether to grant access to data.

Example 16 is a method, comprising: generating a user interface to enable one or more users of a subscribing entity of a cloud service to select, to tag as readable or writable or both, only objects of a first subset of a plurality of objects of a datastore of the cloud service; translating the objects of the first subset and their attributes to mapping information for objects of a second different subset of the plurality of objects; building a reverse multimap corresponding to the objects of the second different subset using the mapping information; and in response to receipt of a request by a user of a hosting entity of the cloud service, identifying a portion of data of the datastore to which the request corresponds and determining whether to grant access to the user of the hosting entity access to that portion of the data using the reverse multimap.

Example 17 includes the subject matter of example 16, or any other example herein, and after the user interface is displayed, receiving tagging information identifying one or more business objects of the first subset of objects and business object attributes corresponding thereto as readable or writable or both; submitting a query to a query parser responsive to the receipt of the request; parsing the query to validate a query syntax; creating and returning a query object corresponding to the query; translating the business objects and their attributes to mapping information comprising tables and columns, the tables and columns comprising ones of the objects of the second subset; and applying the tables and columns to build the reverse multimap.

Example 18 includes the subject matter of any of examples 16-17, or any other example herein, and validating that the query has a filter specified for a target organization; wherein the tables and columns correspond to the target organization.

Example 19 includes the subject matter of any of examples 16-18, or any other example herein, and analyzing the query object for columns of the objects of the second subset that directly or indirectly appear in the query; analyzing corresponding tables and columns for each of the columns that directly or indirectly appear in the query for a set of corresponding business object attributes; creating an accesses set corresponding to the set of corresponding business object attributes comprising accesses granted to each of the business object attributes, the accesses granted of said tagging information; applying system rules or a configuration to select, for the query, a single accesses value which either a first value or a second value that is different than the first value; and stopping further processing of the query and generating an indication that the query violates access rights if the first value is selected.

Example 20 includes the subject matter of any of examples 16-19, or any other example herein, and submitting the query to the datastore for execution to return a result of execution of the query by the datastore if the second value is selected.

Example 21 is a memory device having instructions stored thereon that, in response to execution by a processing device, cause the processing device to perform operations comprising: identifying one or more grants of permission corresponding to one or more first objects, respectively, wherein the one or more first objects comprise only a subset of objects of a datastore, wherein the one or more grants of permission are by a user of the datastore; generating an access control entry for a second object of the objects using at least one of the identified grants of permission, wherein the second object is not exposed to the user; and in responsive to receipt of a query for data corresponding to the objects, determining whether to grant access to the data based on the generated access control entry.

Example 22 includes the subject matter of example 21, and the operations further comprise generating a user interface to enable the user to select, for tagging as readable or writable or both, only objects of the subset of the objects.

Example 22 includes the subject matter of any of examples 21-22, and the second object comprises a relational datastore storage artifact.

Example 23 includes the subject matter of any of examples 21-23, and the relational datastore storage artifact includes at least one of a relational database table, a relational database column, a relational database procedure, a relational database view, a relational database function, or a relational database sequence.

Example 24 includes the subject matter of any of examples 21-24, and the grants of permission are for renderings of data associated with the first objects.

Example 25 includes the subject matter of any of examples 21-25, and the grants of permission are for renderings of data associated with the first objects.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later submitted claims and their equivalents.

What is claimed is:

1. A memory device having instructions stored thereon that, in response to execution by a processing device, cause the processing device to perform operations comprising:
    identifying one or more grants of permission corresponding to one or more first objects, respectively, wherein the one or more first objects comprise only a subset of a plurality of objects of a datastore for a cloud service, wherein the one or more first objects includes a business object and the one or more grants of permission are by a subscriber of the cloud service;
    translating information about the one or more first objects to mapping information comprising tables and columns of second objects of the plurality of objects;
    constructing a reverse multimap to map between the second objects and attributes of the one or more first objects, including applying the tables and columns to build the reverse multimap;
    generating an access control entry for at least one of the second objects using at least one of the identified grants of permission, wherein the second objects are not exposed to the subscriber; and
    in responsive to receipt of a query for data corresponding to the objects, determining whether to grant access to the data based on the generated access control entry, wherein determining whether to grant access to the data based on the generated access control entry includes querying the reverse multimap.

2. The memory device of claim 1, wherein the operations further comprise generating a user interface to enable one or more users of the subscriber to select, for tagging as readable or writable or both, only objects of the subset.

3. The memory device of claim 1, wherein the at least one of the second objects comprises a relational datastore storage artifact.

4. The memory device of claim 3, wherein the relational datastore storage artifact includes at least one of a relational database table, a relational database column, a relational database procedure, a relational database view, a relational database function, or a relational database sequence.

5. The memory device of claim 1, wherein the cloud service comprises a PaaS (platform as a service) and the business object comprises modular combinable code blocks.

6. The memory device of claim 1, wherein the identified one or more grants of permission correspond to at least one of read access or write access.

7. The memory device of claim 1, wherein the operations further comprise:
    using the mapping information to generate the access control entry.

8. The memory device of claim 7, wherein the second objects correspond to at least one of a relational database table, a relational database column, a relational database procedure, a relational database view, a relational database function, or a relational database sequence.

9. The memory device of claim 1, wherein the grants of permission are for renderings of data associated with the one or more first objects.

10. The memory device of claim 1, wherein the operations further comprise:
    submitting a query to a query parser responsive to the receipt of the query for data corresponding to the objects;
    parsing the query to validate a query syntax; and
    creating and returning a query object corresponding to the query.

11. The memory device of claim 1, wherein the operations further comprise identifying received tagging information indicating the one or more first objects and their attributes as readable or writable or both.

12. A memory device having stored thereon:
    an instruction control entry including executable instructions to read tagging data of a first object of a plurality of objects responsive to storage of the first object in a datastore of a cloud service or modification of the first object in the datastore, to generate an access control entry for at least one second object of second objects of the plurality of objects based on a result of the reading;
    a mapping translator module to translate the first object and an attribute of the first object to mapping information comprising tables and columns of the second objects, to construct a multimap to map the attribute of the first object to the second objects, including applying the tables and columns to build the reverse multimap;
    wherein the access control entry is generated based on the reverse multimap; and
    an instruction control interface module to determine whether to grant access to data that is of the datastore and associated with the second objects based on the reverse multimap, to return a result for the query based on a result of the determination.

13. The memory device of claim 12, wherein the returned result includes a grant of access to the data or user messaging indicating no access to the data.

14. The memory device of claim 12, wherein the returned result is to be presented on a web page.

15. The memory device of claim 12, wherein the determination is for access by a first category of user and the memory device further having stored thereon:
an object access tagging module to generate the tagging data based on a user selection of a second category of user that is different than the first category of user.

16. A method, comprising:
generating a user interface to enable one or more users of a subscribing entity of a cloud service to select, to tag as readable or writable or both, only objects of a first subset of a plurality of objects of a datastore of the cloud service;
translating the objects of the first subset and their attributes to mapping information for objects of a second different subset of the plurality of objects, the mapping information comprising tables and columns of objects of the second subset;
building a reverse multimap corresponding to the objects of the second different subset using the mapping information, including applying the tables and columns to build the reverse multimap; and
in response to receipt of a request by a user of a hosting entity of the cloud service, identifying a portion of data of the datastore to which the request corresponds and determining whether to grant access to the user of the hosting entity access to that portion of the data using the reverse multimap.

17. The method of claim 16, further comprising:
after the user interface is displayed, receiving tagging information identifying the objects of the first subset and their attributes as readable or writable or both, wherein the objects of the first subset and their attributes comprise one or more business objects and business object attributes, respectively;
submitting a query to a query parser responsive to the receipt of the request;
parsing the query to validate a query syntax; and
creating and returning a query object corresponding to the query.

18. The method of claim 17, further comprising:
validating that the query has a filter specified for a target organization;
wherein the tables and columns correspond to the target organization.

19. The method of claim 17, further comprising:
analyzing the query object for columns of the objects of the second subset that directly or indirectly appear in the query;
analyzing corresponding tables and columns for each of the columns that directly or indirectly appear in the query for a set of corresponding business object attributes;
creating an accesses set corresponding to the set of corresponding business object attributes comprising accesses granted to each of the business object attributes, the accesses granted of said tagging information;
applying system rules or a configuration to select, for the query, a single accesses value which is either a first value or a second value that is different than the first value; and
stopping further processing of the query and generating an indication that the query violates access rights if the first value is selected.

20. The method of claim 19, further comprising:
submitting the query to the datastore for execution to return a result of execution of the query by the datastore if the second value is selected.

21. A memory device having instructions stored thereon that, in response to execution by a processing device, cause the processing device to perform operations comprising:
identifying one or more grants of permission corresponding to one or more first objects, respectively, wherein the one or more first objects comprise only a subset of a plurality of objects of a datastore, wherein the one or more grants of permission are by a user of the datastore;
translating information about the one or more first objects to mapping information comprising tables and columns of second objects of the plurality of objects;
constructing a reverse multimap to map between the second objects and attributes of the one or more first objects, including applying the tables and columns to build the reverse multimap;
generating an access control entry for at least one of the second objects using at least one of the identified grants of permission, wherein the second objects are not exposed to the user; and
in responsive to receipt of a query for data corresponding to the objects, determining whether to grant access to the data based on the generated access control entry, wherein determining whether to grant access to the data based on the generated access control entry includes querying the reverse multimap.

22. The memory device of claim 21, wherein the operations further comprise generating a user interface to enable the user to select, for tagging as readable or writable or both, only objects of the subset of the objects.

23. The memory device of claim 21, wherein the at least one of the second objects comprises a relational datastore storage artifact.

24. The memory device of claim 23, wherein the relational datastore storage artifact includes at least one of a relational database table, a relational database column, a relational database procedure, a relational database view, a relational database function, or a relational database sequence.

25. The memory device of claim 21, wherein the grants of permission are for renderings of data associated with the first objects.

* * * * *